H. MILLER.
MEASURING INSTRUMENT.
APPLICATION FILED JAN. 10, 1908.

1,120,838.

Patented Dec. 15, 1914.
2 SHEETS—SHEET 1.

WITNESSES:
C. L. Belcher
Otto S. Schauer

INVENTOR
Henry Miller
BY
Wesley G. Carr
ATTORNEY

H. MILLER.
MEASURING INSTRUMENT.
APPLICATION FILED JAN. 10, 1908

1,120,838.

Patented Dec. 15, 1914.
2 SHEETS—SHEET 2.

WITNESSES:
C. L. Belcher
Otto S. Schairer

INVENTOR
Henry Miller
BY
Wesley G. Carr
ATTORNEY

UNITED STATES PATENT OFFICE.

HENRY MILLER, OF EAST ORANGE, NEW JERSEY, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

MEASURING INSTRUMENT.

1,120,838.  Specification of Letters Patent.  Patented Dec. 15, 1914.

Application filed January 10, 1908. Serial No. 410,212.

*To all whom it may concern:*

Be it known that I, HENRY MILLER, a citizen of the United States, and a resident of East Orange, in the county of Essex and State of New Jersey, have invented a new and useful Improvement in Measuring Instruments, of which the following is a specification.

My invention relates to measuring instruments, and it has for its object to provide simple and economical means whereby the torque exerted by a helical or spiral spring for a given deflection thereof may be readily and accurately determined.

In the construction of electrical and other measuring instruments of the indicating type, spiral springs are frequently employed for the purpose of normally maintaining the movable elements in the zero or other predetermined positions and for opposing torques to those exerted between the stationary and movable members of the instruments. In the manufacture of such instruments, it is usually desirable that the torque exerted by a spring for a given deflection thereof shall be known before the spring is placed in the instrument, and it is the object of the present invention to provide an instrument whereby the torque exerted by a spring, for a given deflection thereof, may be determined with expedition and precision.

Figure 1:
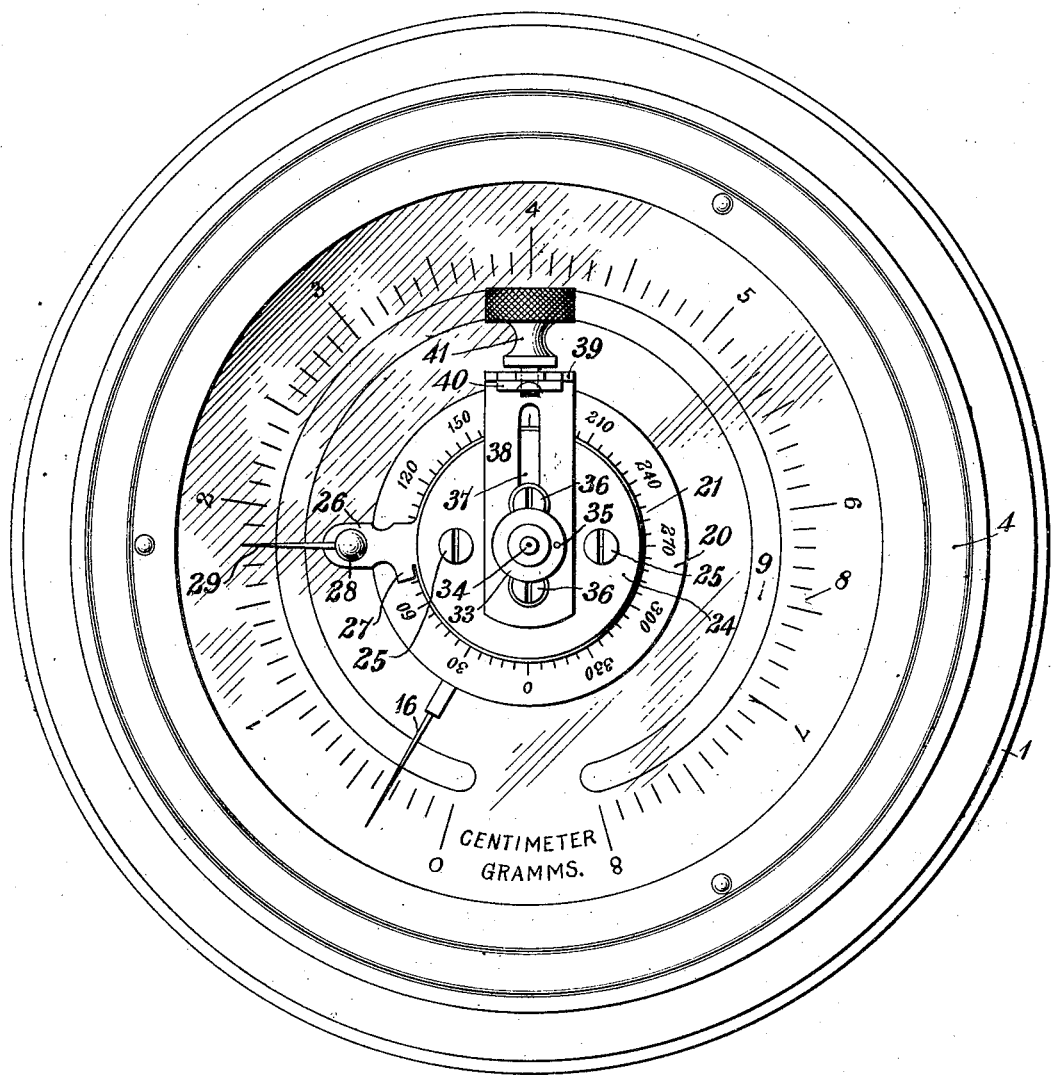
Figure 2:
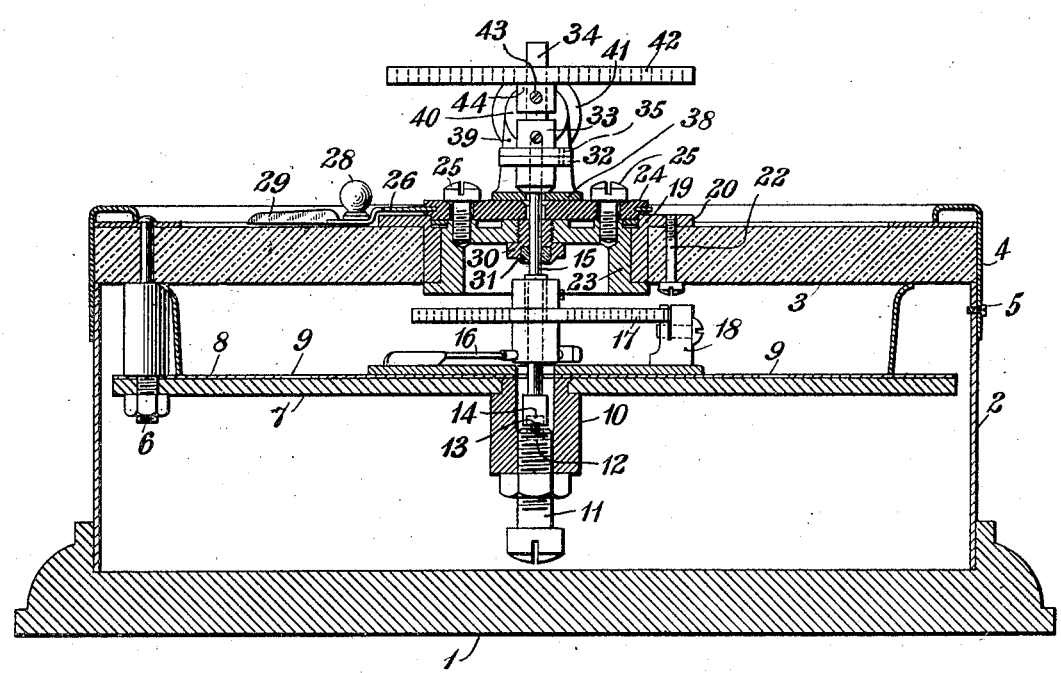

Figure 1 of the accompanying drawings is a face view of an instrument constructed in accordance with my invention, and Fig. 2 is a view, in transverse section, of the instrument shown in Fig. 1.

The operating parts of the instrument are inclosed within a case comprising a wooden base 1 and a cylindrical sheet metal side piece 2 upon the upper edge of which rests an annular plate of glass 3, a ring 4 that extends downwardly over the upper end of the side piece 2 and is secured thereto by means of screws 5, being provided for clamping the said plate in position. Suspended from the plate 3 by means of bolts 6 is a dial plate 7, having a graduated scale 8 and a reflecting surface 9 upon its upper face, and secured to the middle of the plate is a downwardly extending lug 10 which is internally screw-threaded for the reception of a screw 11 having a concave bearing jewel 12 in its upper end. The jewel 12 is provided with a ball 13, upon which bears another concave jewel 14 mounted in the lower end of a vertical shaft 15 having a pointer 16 adapted to move over the scale 8 and the mirror 9.

Secured at its inner end to shaft 15 is a spiral spring 17, the outer end of which is secured to a stationary post 18, the said spring serving to normally maintain the pointer 16 directly over the zero mark of the scale 8.

Within the opening in the annular plate 3 is a bushing 19 having a flange 20 that extends outwardly over the upper face of the plate and is provided upon its upper face with a scale 21 that may be graduated in degrees, as shown, or in any other desired units, the said bushing being held stationary by means of a screw 22 that extends upwardly through the plate 3. The bushing 19 serves as a bearing for a rotatable member comprising another flanged bushing 23 and a plate 24 that is secured, by means of tap-screws 25, to the upper end of the bushing 23, the plate 24 being provided with an arm 26 having a projection 27 the straight radial edge of which serves as an index to coöperate with the scale 21. The arm 26 is also provided with a button or handle 28 whereby the plate 24 and the remainder of the movable member may be adjusted in position, and with a pointer 29 that extends over the scale 8 and the mirror 9.

Screw-threaded into the bushing 23 is a supporting member or bushing 30 for a ring or annular shaped jewel 31, said jewel serving as an upper bearing for the shaft 15 which projects through it and through and above the plate 24.

The shaft 15 is provided, at its outer end, with a flanged collar 32 and upon said collar is supported another flanged collar 33 from which a shaft 34, of any desired diameter, projects upwardly, the said collars being caused to rotate together by means of a dowel pin 35 that extends upwardly from the flange of the collar 32.

Secured to the upper face of the plate 24, by means of screws 36 that project through a slot 37 therein, is a bracket 38 having an upwardly extending post 39 at the extremity of which is a clamp comprising a block 40 and a thumb-screw 41, the bracket being adjustable in a radial direction by reason of the provision of the slot 37.

In utilizing the instrument, the inner end of a spring 42 of unknown calibration is rigidly clamped to a bushing 44 on the shaft 34 by means of a set-screw 43. In order to adapt the instrument for use in determining the calibration of springs that are mounted upon bushings of different internal diameters, a plurality of collars 33 having shafts 34 of different diameters may be provided to accompany the instrument. With the radial edge of the projection 27 registering with the zero mark of the scale 21 and the pointers 16 and 29 registering with the zero mark of the scale 8, the outer end of the spring 42 is then clamped to the post 39 by means of the block 40 and the thumb-screw 41. If the spring 42 is then deflected by moving the arm 26 until the index 27 has been moved a number of degrees over the scale 21, the torques exerted by the springs 42 and 17 will be opposed and balanced, and the pointer 16 will indicate, upon the scale 8, the amount of torque exerted by each spring, the scale 8 having previously been graduated in any desired units, such, for instance, as centimeter grams. Thus, the torque exerted by the spring 42 for a given deflection may be read directly upon the scale 8 and the torques for any desired number of deflections may be readily determined. For springs of different radii, the bracket 38 may be adjusted in a radial direction.

There are several methods of calibrating the unknown spring. One method provides that the calibration of the known spring must be plotted between torques and deflections. The curve between the torques as measured by pointer 16 and the deflections indicated by indicator 27 is plotted on the same sheet of paper, the deflections for the same torques are subtracted and that value plotted for each torque, that is the calibration curve of the unknown spring. Another method makes use of the pointer 29 in that the ratio of the deflection of the pointer 29 is to the deflection of the pointer 16 as the deflection of the indicator 27 is to $x$, then the deflection of indicator 27 minus $x$ is the deflection of the unknown spring for the deflection as indicated by pointer 16.

I claim as my invention:

1. In an instrument, the combination with a shaft, an indicator carried thereby, and a scale with which the indicator coöperates, of a spring of known calibration adapted to normally maintain the shaft in a predetermined position, means for mounting a spring of unknown calibration upon the shaft with one of its ends secured thereto, a member rotatable about the shaft and having one end of the spring of unknown calibration secured to it, and means for indicating the degree of displacement of the said rotatable member from its initial position.

2. In an instrument, the combination with a spring of known calibration, of means for opposing thereto a spring of unknown calibration, and means including the spring of known calibration for determining the force exerted by the spring of unknown calibration for a predetermined deflection thereof.

3. In an instrument, the combination with means for opposing the force exerted by a spring of known calibration by that of a spring of unknown calibration, and means including the spring of known calibration for indicating the value of the opposing force.

4. In an instrument, the combination with means for opposing the force exerted by a spring of known calibration by that of a spring of unknown calibration, means including the spring of known calibration for indicating the value of the opposing forces, and means for subjecting the spring of unknown calibration to different degrees of deflection.

5. In an instrument, the combination with a shaft and two concentric scales, of indicators for the respective scales, a spring of known calibration interposed between a stationary part and one of the indicators, means for interposing a spring of unknown calibration between the two indicators and means including the spring of known calibration for adjusting one of said indicators to determine the torque exerted by the spring of unknown calibration.

6. In an instrument, the combination with two annular scales, and a shaft concentrically disposed with reference to said scales, of an indicator mounted on said shaft to coöperate with one of said scales, a spiral spring of known calibration having one end attached to said shaft and its other end held stationary, a manually adjustable indicator mounted independently of the shaft to coöperate with the other scale, and a spiral spring of unknown calibration having one end attached to the shaft and its other end connected to the manually adjustable indicator.

7. In an instrument, the combination with a spiral spring of known calibration, of means for rotatively opposing thereto a spiral spring of unknown calibration, and means including the spring of known calibration for determining the torque exerted by the spring of unknown calibration for a predetermined deflection thereof.

8. In an instrument, the combination with means for rotatively opposing the torques exerted by a spiral spring of known calibration and a spiral spring of unknown calibration, and means including the spring of known calibration for indicating the value of the opposing torques.

9. In an instrument, the combination with means for rotatively opposing the torques exerted by a spiral spring of known calibration and a spiral spring of unknown calibration, means including the spring of known calibration for indicating the value of the opposing torques, and means for subjecting the spring of unknown calibration to different degrees of deflection.

10. In an instrument, the combination with means for rotatively opposing the torques exerted by a spiral spring of known calibration and a spiral spring of unknown calibration, and an indicator actuated by said springs for indicating the value of the opposing torques.

11. In an instrument, the combination with means for rotatively opposing the torques exerted by a spiral spring of known calibration and a spiral spring of unknown calibration including means for adapting the instrument to unknown springs of various diameters, and an indicator actuated by said springs for indicating the value of the opposing torques.

In testimony whereof, I have hereunto subscribed my name this twenty third day of December, 1907.

HENRY MILLER.

Witnesses:
R. C. HUNTER,
G. L. MOYER,
EDWD. W. CAMPBELL.

Copies of this patent may be obtained for five cents each, by addressing the "Commissioner of Patents, Washington, D. C."